March 18, 1930. L. GRISWOLD 1,750,929
GAUGE FOR PUNCHES
Original Filed Jan. 14, 1928
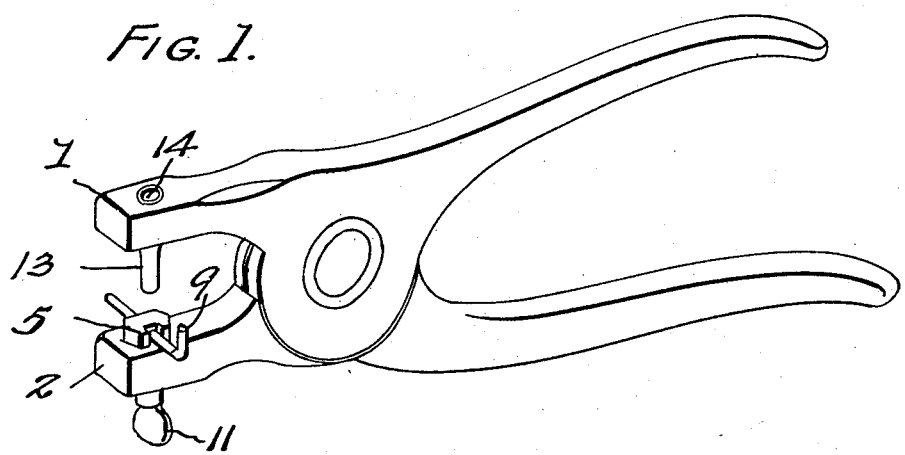
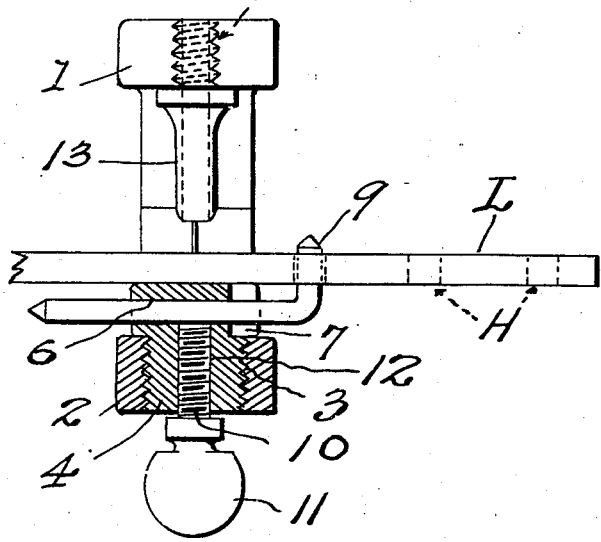
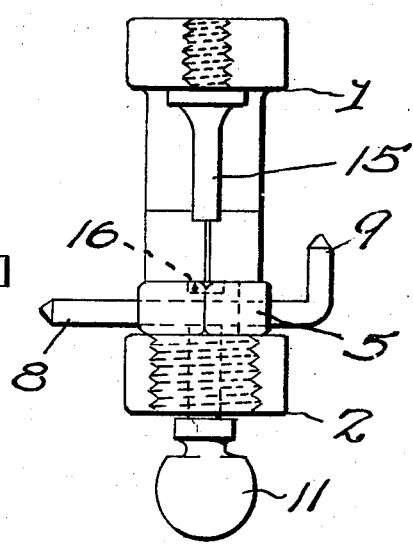
Inventor
LESTER GRISWOLD
By Thomas R. Harney
Attorney Patented Mar. 18, 1930

1,750,929

UNITED STATES PATENT OFFICE

LESTER GRISWOLD, OF COLORADO SPRINGS, COLORADO

GAUGE FOR PUNCHES

Application filed January 14, 1928, Serial No. 246,769. Renewed November 26, 1929.

My present invention relates to improvements in gauges for punches, and while my invention is designed especially for use in connection with hand tools of the pivoted type, and for the particular purpose of spacing holes to be punched in leather strips, it will be understood that the gauges may be used with other tools and for other purposes. The primary object of my invention is the provision of an adjustable gauge for use in a hand-punch, by means of which a row of holes, spaced equidistantly apart, may be fashioned in a leather strip, or other material. By the utilization of the device of my invention, the tool may be manipulated with facility, and the holes may be successively punched along a predetermined line as required at the desired and uniform distance apart.

In the accompanying drawings I have illustrated one complete example of the physical embodiment of my invention wherein the parts of the invention are combined with a tubular punch, according to one mode I have devised for the practical application of the principles of my invention. A slightly modified form of the invention is also illustrated, in connection with a hand tool having a solid punch.

Figure 1 is a perspective view of the well known type of pivoted hand tool with which my invention is embodied, and showing a tubular punch. Figure 2 is a face view of the tool with the jaws open, the lower jaw and the gauge holder being shown in section. Figure 3 is a top plan view of the lower jaw with the gauge of my invention attached thereto. Figure 4 is a detail face view of the open jaws of the tool equipped with a solid punch and the gauge of my invention.

In carrying out my invention I preferably use a hand tool of the pivoted, spring pressed type, that is provided with the usual jaws 1 and 2, and the latter jaw is provided with a threaded socket 3 therein. This socket is designed to receive the gauge holder, which comprises a threaded nut 4 that is fashioned with an anvil-head 5, and it will be apparent that the nut is to be threaded into the socket of the jaw with the anvil head above the top face of the jaw, as indicated.

The anvil-head may be of any desired shape, but is here shown as angular, in order that the holder may conveniently be secured in the socket of the jaw. In the anvil-head a tranversely extending hole 6 is provided, and at one side of the head this hole terminates in a lateral notch 7. The transverse hole and the notch are located in the anvil, above the threaded portion of the gauge holder and above the top of the lower jaw 2 in order that the L-shaped gauge may be manipulated and readily adjusted for use.

The L-shaped gauge is fashioned with a long arm 8 and an integral, angular, shorter pin 9, the long arm being designed to slip through the transverse hole for the purpose of adjusting the distance of the pin 9 toward or away from the axial center of the gauge-holder and the center of the jaw 2. The notch 7 is designed to accommodate the pin 9 when the pin is adjusted the minimum distance from the center of the jaw. By thus adjusting the gauge in the holder the distance between the holes H in the leather strip L may be varied as desired within the limits of the length of the longer arm 8 of the gauge.

The gauge is held in adjusted position in its holder by means of a set screw 10 having a head 11 and threaded in the hole 12 that extends upwardly through the axial center of the nut, from its under face to the transverse opening in the anvil. The set screw, at its inner end, impinges against the long arm of the gauge and holds the latter rigidly in the anvil-head.

In Figures 1 and 2 a tubular punch 13 is illustrated as threaded at 14 in the jaw 1, and this punch, when the tool is manipulated, is designed to co-act with the anvil-head and fashion the holes H in the leather strip L.

In Figure 4 a solid punch 15 is rigidly held by threads in the jaw 1, and the face of the anvil-head is fashioned with a slight depression, shown by dotted lines at 16, to accommodate the punch as it passes through the leather strip. The punches may be interchanged, or other types of punches may be used.

I claim:

In a hand operated implement of the pivot type, the combination with a jaw having a rigid punch and a complementary jaw having a threaded socket, of a nut threaded in the socket and fashioned with an anvil-head, an L-shaped, transversely arranged gauge adjustable in an opening in the anvil and adapted to be disposed with its shorter arm in a plane parallel with the punch, and a thumb screw in the nut for retaining the gauge in adjusted position.

In testimony that I claim the foregoing as my own, I have hereto affixed my signature.

LESTER GRISWOLD.